(No Model.)
J. J. FAULKNER.
COTTON SEED DELINTER.
No. 546,281. Patented Sept. 10, 1895.
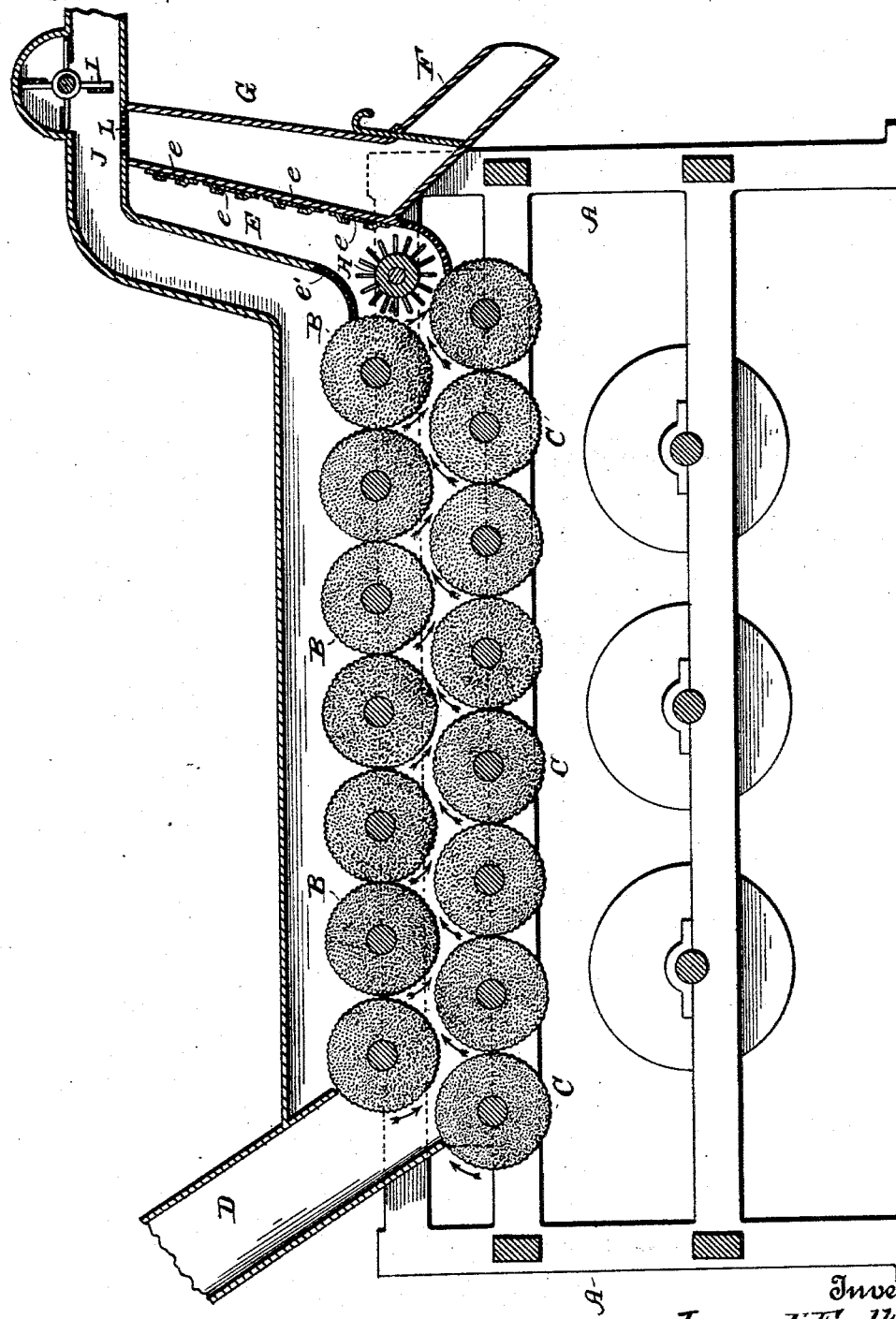
Witnesses
Victor J. Evans.
L. M. Marble
Inventor
James J. Faulkner.
By E. M. Marble & Sons
Attorneys

UNITED STATES PATENT OFFICE.

JAMES J. FAULKNER, OF MEMPHIS, TENNESSEE, ASSIGNOR TO THE STANDARD COTTON SEED COMPANY, OF ARKANSAS.

COTTON-SEED DELINTER.

SPECIFICATION forming part of Letters Patent No. 546,281, dated September 10, 1895.

Application filed August 16, 1895. Serial No. 559,509. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters;" and it consists in the improved cotton-seed delinter whose construction and arrangement of parts will be hereinafter fully described, and particularly pointed out in the claims.

My present invention belongs to what may be termed the "roll" type of cotton-seed delinters—that is to say, delinters in which the removal of the lint from the seed is accomplished by the scouring or abrading action of a series of rolls placed with their surfaces in sufficiently close proximity to prevent passage of seed between the same, and actuated so that they all move in the same direction over which the seed is caused to travel by some suitable means. Machines of this class are described in applications for Letters Patent filed by me May 18, 1895, Serial No. 549,813, and June 22, 1895, Serial No. 553,888.

The object of my present invention is to provide a machine of this type in which extreme simplicity of construction can be obtained, especially with regard to the seed inlet and discharge openings, and in which the intensity of the abrading action will be proportional to the stage of the delinting operation, increasing as the lint is removed from the seed, so that a complete and finished product will be insured.

I further aim to provide a machine of the roll type in which means shall be used for removing the lint from the ends of the seed as well as from the sides thereof. The roll type of machine is especially efficient in removing the lint from the sides of the seed; but I find that to obtain the removal of the lint from the ends of the seed it is necessary in most constructions to make special provision with reference thereto.

In accomplishing the object of my invention, I make use of two series of abrading-rolls, the roll of each series being placed with their meeting faces in sufficiently close proximity to prevent passage of seed between the same, and being rotated so that they move in the same direction. I place the two series of rolls at about the same distance apart which experience has indicated is the best distance between the abrading-surface of a delinting-cylinder and the casing therefor—namely, approximately five-eighths of an inch. I further arrange the rolls so that the center of each roll of each series is equidistant from the centers of the two adjacent rolls of the opposite series. In this manner I cause the formation of a number of triangularly-shaped inclosures, the abrading-surfaces forming which move in opposite directions, through which the seed must pass in its progress through the machine. I rotate the rolls constituting one series in a direction opposite to that of the rotation of the rolls constituting the other series, so that contiguous faces of the two sets of rolls move in the same direction. The conveying of the seed under treatment through the machine is thus most readily accomplished, as the rolls act by themselves to force the seed through the machine with sufficient rapidity. This construction also renders it unnecessary to peculiarly construct the abrading-rolls in order to insure the conveying of the seed into the inclosure formed by the rolls and the discharge of the seed therefrom. It is simply necessary to form a spout or feed-pipe longitudinally of the rolls, at one end thereof, to conduct the seed to be treated to a point where it will be subjected to the action of the rolls. No construction is necessary to arrange for the discharge of the seed; but as I wish to provide means regulating the duration of treatment of the seed, so that the product obtained may be entirely satisfactory, I place an upright pipe at the discharge end of the machine, whose mouth is in such close proximity to the end rolls that all of the seed passing between said rolls will pass into and rise up in said pipe. As the seed banks up in this pipe, a back-pressure on the seed under treatment in the machine is obtained, and as the height to which the seed rises in the pipe is entirely within the control of the operator, it will be seen that the intensity of the scouring action to which the seed under treatment is subjected is capable of regulation within any desired limit. A great advantage of my present construction lies in the fact that the intensity of the scouring action, due to the operation of this stand-pipe, increases as the discharge end of the machine is approached, so that the removal of the fine lint from the seed under treatment is insured.

The removal of the lint, which is separated from the seed by the action of the machine, is caused by an air-current which is caused to sweep over the face of the upper rolls, and which by its action causes air-currents to issue between adjacent rolls, thus causing all the lint scoured from the seed under treatment to be caught upon the surfaces of the rolls constituting the upper series, where it can be readily discharged into the lint-removal flume as the rolls complete their revolution and bring the lint out of the abrading-inclosure. The lint removal action of my machine is very complete, and as it takes place constantly and at regular intervals throughout the entire abrading action, the abrading-surfaces are permitted to expand their energy almost entirely upon the removal of the lint from the seed under treatment. Very little grinding of the lint takes place.

My invention is fully represented in the drawing which accompanies and forms a part of this application, in which the same reference-letters refer to the same or corresponding parts, and in which is represented a central longitudinal section of my machine.

Referring to the drawing, A represents the machine-frame, in which are journaled in a suitable manner two series of rolls B and C. The rolls constituting each series are placed with their surfaces in sufficiently close proximity to prevent passage of seed between the same, and are actuated by suitable connections with power elements so that they all move in the same direction. The two sets or series of rolls are placed at about the same distance apart as that which exists between a delinting-cylinder and its casing—namely, about five-eighths of an inch—though this distance may be varied as is necessary in order to secure the best results. The rolls forming the two series are "staggered" with relation to each other—that is to say, the center of each roll in each series is equidistant from the centers of the two adjacent rolls of the opposite series. This results in the formation of a number of triangularly-shaped inclosures between the rolls, through which the seed must pass during its treatment in the machine. The rolls forming one series are actuated so as to move in the opposite direction to the rolls forming the other series, the directions of rotation being indicated by the arrows on the drawing. I have further found it advisable to rotate the lower series of rolls at a slower rate of speed than the upper series, in order that the abrading action produced may be thorough and complete.

At one end of the machine I locate a feed-spout D, which extends across the machine the entire length of the abrading-rolls and conveys the seed to a point where it is subjected to the influence of the first two rolls of the two series of rolls. The seed is conveyed through the machine by the action of the abrading-rolls themselves. Contiguous faces of the two series of rolls move in the same direction, and thus insure a positive and rapid conveying of the seed through the machine. The seed, after passing through the machine, banks up in an upright pipe E, the mouth of which is in such close connection to the end rolls of the two series of rolls that discharge of seed at this point is impossible, and which has formed on one side thereof a number of gates e. The amount of back-pressure caused by the seed rising in the upright pipe E is regulated by the point at which the discharge of seed therefrom is effected, this taking place by the withdrawal of one of the gates e. The discharge of the seed from the machine takes place through the spout F, formed in the outer wall or frame G.

In the roll type of cotton-seed delinters it has been found that the lint is always removed from the sides of the seed under treatment; but difficulty has been sometimes occasioned in effecting the removal of the lint from the ends of the seed as well. This difficulty is obviated in my present machine by the use of the spiked roller H, stationed in the mouth of the upright pipe E and operating in close connection with the two end rolls. The seed, in order to rise in the pipe E, must pass the spiked roller H; but before it can pass by this roller it will rest in the compartments formed on the surfaces thereof by the spikes, and the ends of the seed will naturally be most subjected to the abrading action which then takes place, so that the removal of the lint from the ends of the seed is accomplished.

The removal of the lint which is separated from the seed by the action of the machine is brought about by means of an air-current caused to sweep over the upper surfaces of the top series of rolls by the action of the fan I, stationed in the air-flume J. This air-current draws its supply from the air beneath the machine, so that air-currents are caused to pass upward through all portions of the machine between adjacent rolls. This results in the lint which is scoured from the seed clinging to the abrading-surfaces of the rolls forming the upper series, and being removed from the abrading-inclosure by said rolls as they complete their revolution. It is then at once swept away into the exhaust-flume. In order to remove the lint which is scored from the ends of the seed by the roll H, I perforate the enlarged mouth of the upright pipe at this point, as shown at e', and to make certain of the removal of all of the fine lint from the seed as it is discharged, I perforate that portion of the air-flume which forms the top of the space between the pipe E and the frame or casing F, as shown at L. Complete removal of the lint is thus secured.

The dirt which is separated from the seed by the action of the machine falls into the angled inclosures formed by the bottom series of rolls and is removed from the abrading-inclosure as such lower series of rolls complete their revolution.

The operation of my machine is as follows: The seed fed into the machine through the feed-spout D is at once carried into the inclosure in which the abrading action takes place by the rolls stationed at this end of the machine. The rolls constituting the two series of rolls move in opposite directions, so that contiguous faces thereof move in the same direction. The passage of the seed through the machine is thus insured. The duration of the treatment of the seed in the machine is regulated by the height to which the seed is allowed to rise in the upright pipe E, this being governed by the choice of the gate e through which the seed is allowed to escape from said upright pipe. The seed is finally discharged through the discharge-spout F. The seed during its passage through the machine is constantly subjected to an abrading action. As it passes between each two rolls it is subjected to a scouring action, and as it further emerges into the triangularly-shaped inclosures formed between the rolls it is still further scoured by being brought into contact with the positively-moving abrading-surfaces, while at the same time its forward passage through the machine is insured by the action of such surfaces. The elasticity of the seed further causes it to change its position as it passes into each one of the triangular inclosures, so that a new face thereof is constantly subjected to the abrading action. Any number of rolls may be used to form a complete machine, so that the complete removal of the lint from the seed under treatment is insured.
I prefer to form my rolls with slightly roughened or corrugated surfaces, as shown, though I may use a plain roll, if desired. The corrugated roll serves to affect a more positive conveyance of the seed through the machine, and also has a more satisfactory abrading action than the plain roll.

The lint which is scoured off the seed by the action of the machine is drawn upward by the air-current caused to exist by the fan I stationed in the air-flume J, and passing out of the abrading-inclosure on the surface of the rolls, forming the upper face thereof, is swept away into the air-flume. The dirt which is separated from the seed by the action of the machine by reason of its specific gravity falls into the inclosures formed between adjacent rolls of the lower series and passes out with these rolls as they complete their revolution. The lint and dirt are thus removed from the seed under treatment constantly throughout the entire abrading action, so that the abrading-surfaces act almost entirely upon the surface of the seed and very little grinding of the lint takes place.

Having thus fully described my invention, what I claim as new, and desire to secure by Letters Patent, is—

1. In a cotton seed delinter, the combination with a series of abrading rolls, placed with their meeting faces in sufficiently close proximity to prevent passage of seed between the same, and means for rotating said rolls in the same direction, of a second series of rolls of the same diameter as those constituting the first series, and also placed with their meeting faces in sufficiently close proximity to prevent passage of seed between the same, said rolls being arranged so as to form a casing for one side of the first series of rolls, and each being journaled with its center equidistant from the centers of the two adjacent rolls of the first series, means for rotating said second series of rolls in the same direction, and means for causing an air current to sweep over the rolls, substantially as described.

2. In a cotton seed delinter, the combination with a series of abrading rolls, placed with their meeting faces in sufficiently close proximity to prevent passage of seed between the same, and means for rotating said rolls in the same direction, of a second series of rolls of the same diameter as those constituting the first series, and also placed with their meeting faces in sufficiently close proximity to prevent passage of seed between the same, said rolls being arranged so as to form a casing for one side of the first series of rolls, and each being journaled with its center equidistant from the centers of the two adjacent rolls of the first series, means for rotating said second series of rolls in the same direction, and opposite to the direction of the rotation of the rolls forming the first series, and means for causing an air current to sweep over the rolls, substantially as described.

3. In a cotton seed delinter, the combination with a series of abrading rolls, placed with their meeting faces in sufficiently close proximity to prevent passage of seed between the same, and means for rotating said rolls in the same direction, of a second series of rolls of the same diameter as those constituting the first series, and also placed with their meeting faces in sufficiently close proximity to prevent passage of seed between the same, said rolls being arranged so as to form a casing for one side of the first series of rolls, and each being journaled with its center equidistant from the centers of the two adjacent rolls of the first series, means for rotating said second series of rolls in the same direction, oppositely to the direction of rotation of the rolls forming the first series and at a different rate of speed, and means for causing an air current to sweep over the rolls, substantially as described.

4. In a cotton seed delinter, the combination with a series of abrading rolls, placed with their meeting faces in sufficiently close proximity to prevent passage of seed between the same, and means for rotating said rolls in the same direction, of a second series of rolls of the same diameter as those constituting the first series, and also placed with their meeting faces in sufficiently close proximity to prevent passage of seed between the same, said rolls being arranged so as to form a casing for one side of the first series of rolls, and each being journaled with its center equidistant from the centers of the two adjacent rolls of the first series, means for rotating said second series of rolls in the same direction, and opposite to the direction of rotation of the rolls forming the first series, a spiked roll operating in connection with the two end rolls, and means for causing an air current to sweep over the rolls, substantially as described.

5. In a cotton seed delinter, the combination with a series of abrading rolls, placed with their meeting faces in sufficiently close proximity to prevent passage of seed between the same, and means for rotating said rolls in the same direction, of a second series of rolls of the same diameter as those forming the first series, and also placed with their meeting faces in sufficiently close proximity to prevent passage of seed between the same, said rolls being arranged so as to form a casing for one side of the first series of rolls, and each being journaled with its center equidistant from the centers of the two adjacent rolls of the first series, means for rotating said second series of rolls in the same direction, and opposite to the direction of rotation of the rolls forming the first series, an upright pipe arranged in connection with the end rolls so that the seed will bank up therein, a discharge opening in the same, and means for causing an air current to sweep over the rolls, substantially as described.

6. In a cotton seed delinter, the combination with a series of abrading rolls, placed with their meeting faces in sufficiently close proximity to prevent passage of seed between the same, and means for rotating said rolls in the same direction, of a second series of rolls of the same diameter as those constituting the first series, and also placed with their meeting faces in sufficiently close proximity to prevent passage of seed between the same, said rolls being arranged so as to form a casing for one side of the first series of rolls, and each being journaled with its center equidistant from the centers of the two adjacent rolls of the first series, means for rotating said second series of rolls in the same direction, and opposite to the direction of rotation of the rolls forming the first series, a spiked roll operating in connection with the two end rolls, an upright pipe arranged in connection with the end rolls so that seed will bank up therein, a discharge opening in the same, and means for causing an air current to sweep over the rolls, substantially as described.

In testimony whereof I affix my signature in presence of two witnesses.

JAMES J. FAULKNER.

Witnesses:
   J. F. HUDSPETH,
   F. E. WATERS.